(12) United States Patent
Tse

(10) Patent No.: US 6,955,265 B2  
(45) Date of Patent: Oct. 18, 2005

(54) APPARATUS OF PIERCING GARBAGE BAGS AND CLASSIFYING GARBAGE

(75) Inventor: Steven Tse, Room G08, Block 7, Kang Yuan, Dashi, GuangZhou Country Garden, Panyu, Guangzhou City, Gangdong, 511430 (CN)

(73) Assignee: Steven Tse, Guangzhou (CN)

( * ) Notice: Subject to any disclaimer, the term of this patent is extended or adjusted under 35 U.S.C. 154(b) by 173 days.

(21) Appl. No.: 10/436,108

(22) Filed: May 13, 2003

(65) Prior Publication Data

US 2004/0226867 A1 Nov. 18, 2004

(51) Int. Cl.[7] ............................................. B07C 9/01
(52) U.S. Cl. ................. 209/683; 209/680; 209/288; 209/930; 209/688
(58) Field of Search ................................ 209/680, 930

(56) References Cited

U.S. PATENT DOCUMENTS

| | | | | |
|---|---|---|---|---|
| 1,250,554 A | * | 12/1917 | Bryan et al. | 209/86 |
| 1,845,441 A | * | 2/1932 | Robertson | 209/86 |
| 3,224,839 A | * | 12/1965 | Pierson | 209/86 |
| 3,233,836 A | * | 2/1966 | Merges | 209/86 |
| 4,018,675 A | * | 4/1977 | Petrucci | 209/86 |
| 4,265,408 A | * | 5/1981 | Voelskow | 241/87 |
| 4,543,029 A | * | 9/1985 | Grun et al. | 414/412 |
| 4,634,060 A | * | 1/1987 | Riemann et al. | 241/74 |
| 5,101,977 A | * | 4/1992 | Roman | 209/3 |
| 5,163,627 A | * | 11/1992 | Bouche | 241/23 |
| 5,188,500 A | * | 2/1993 | Eide et al. | 414/412 |
| 5,348,162 A | * | 9/1994 | Wroblewski | 209/35 |
| 5,484,247 A | * | 1/1996 | Clark et al. | 414/412 |

* cited by examiner

Primary Examiner—Donald P. Walsh  
Assistant Examiner—Jonathan R Miller  
(74) Attorney, Agent, or Firm—Ware, Fressola, Van Der Sluys & Adolphson LLP

(57) ABSTRACT

An apparatus comprises a cylindrical rotary piercing and screen assembly including surface openings, rows of first needles, and rows of blades, and a channel-shaped washing and dispersion mechanism. Garbage bags are pierced by the first needles and the blades as the piercing and screen assembly is rotating, and the pierced garbage bags discharged from the piercing and screen assembly to the washing and dispersion mechanism are pushed forward by water sprayed from the first injection nozzles, scattered by water sprayed from the second injection nozzles, and further pierced by the second needles so as to facilitate a subsequent garbage classification. The invention can effectively recycle garbage for future use, resulting in a significant reduction of garbage and an improvement of environment.

15 Claims, 13 Drawing Sheets

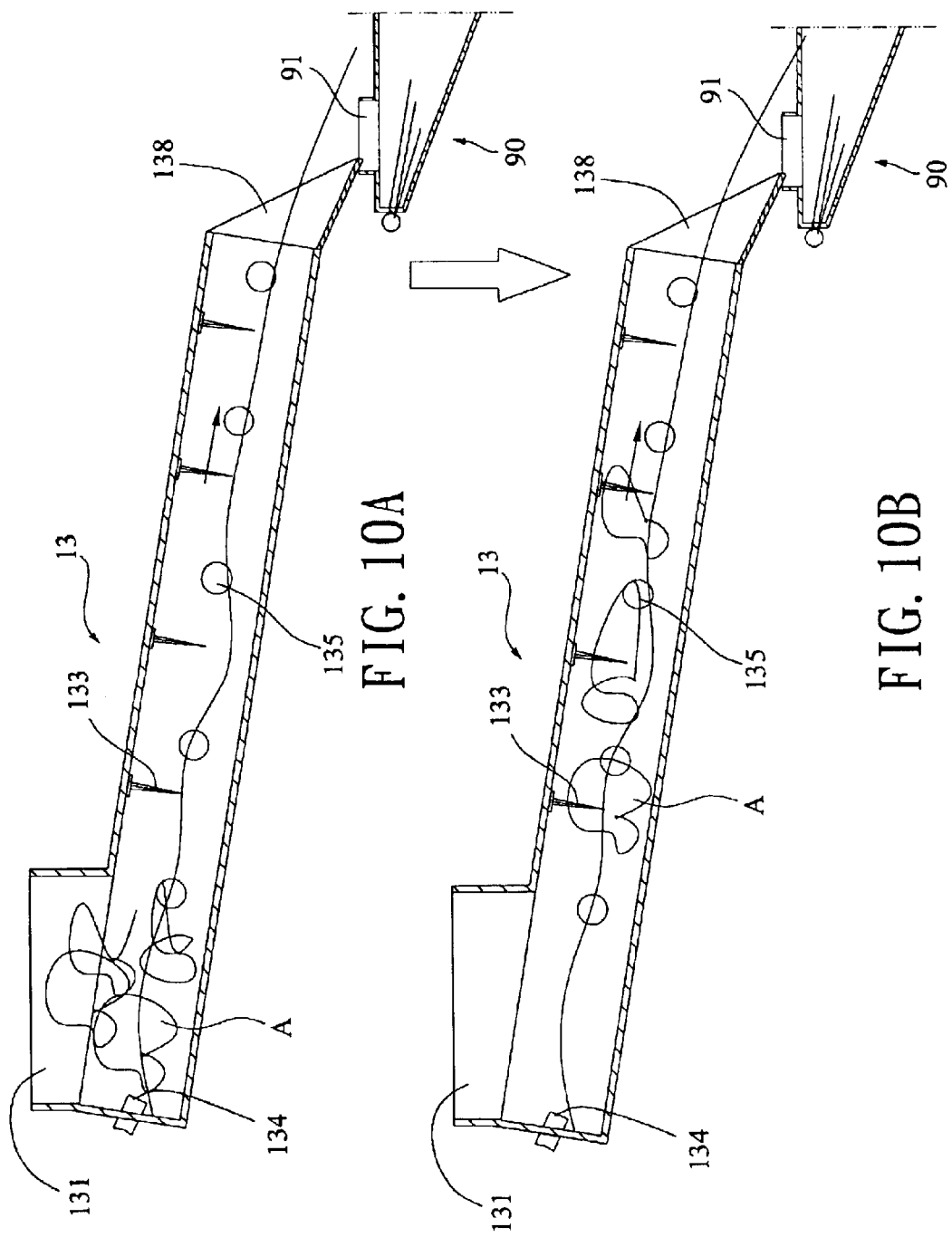

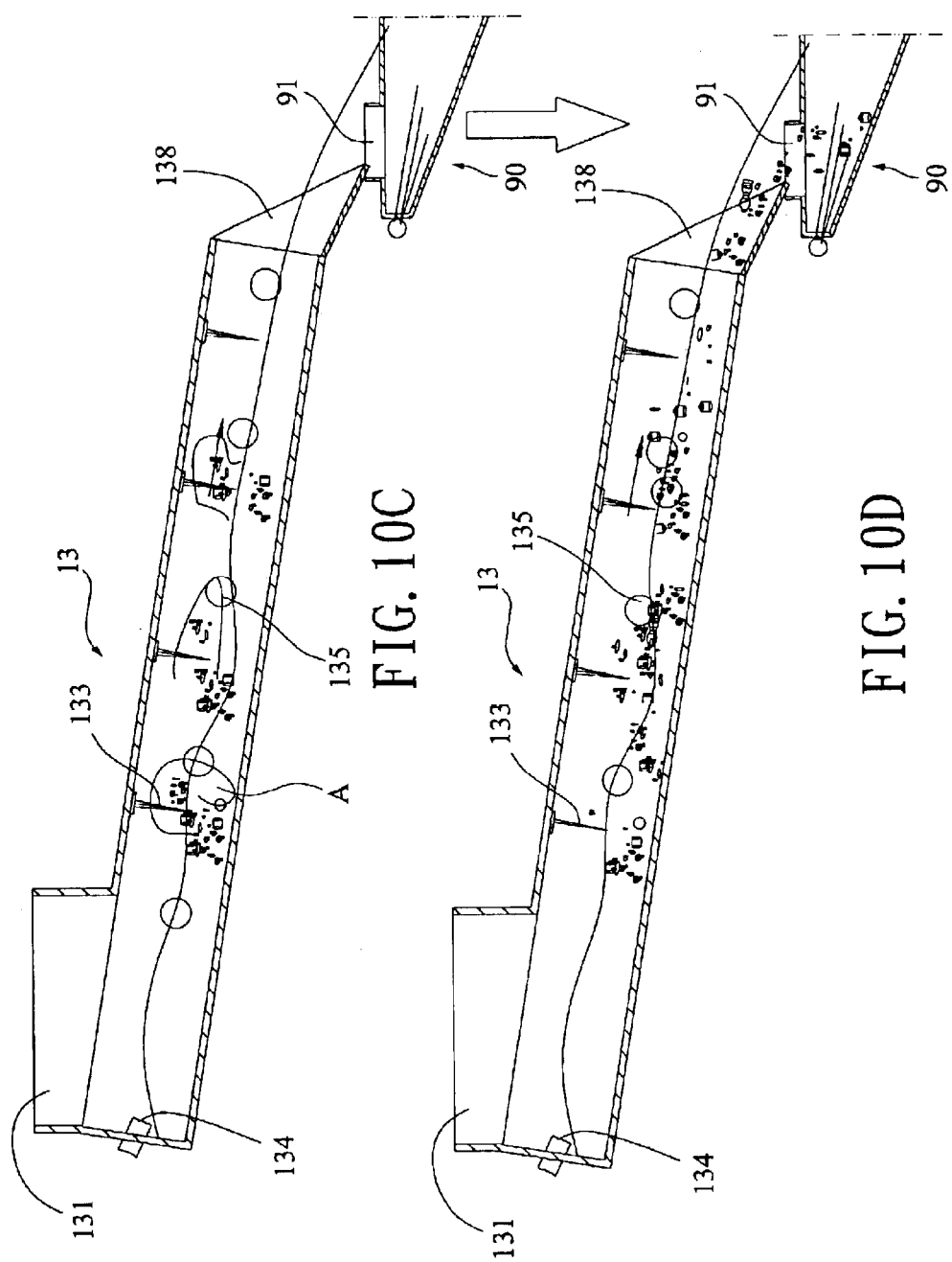

APPARATUS OF PIERCING GARBAGE BAGS AND CLASSIFYING GARBAGE

BACKGROUND OF THE INVENTION

1. Field of the Invention

The present invention relates to garbage disposal and more particularly to an apparatus of piercing garbage bags and classifying garbage contained therein.

2. Description of Related Art

Plastic products are widely used in our daily life. They can bring convenience. However, plastic garbage is difficult of degrading within, for example, 100 years. As such, plastic garbage is a major pollution source of environment as viewed by many people. It is often seen that plastic bags and food containers made of plastic foam are littered. As to garbage disposal, typically there are techniques widely used throughout the world. Namely, landfill occupies a lot of precious lands. Further, a reuse of the land is made impossible even after the land is no longer used for garbage landfill in the future. This is because the buried plastic bags and food containers made of plastic foam can block water permeation. The other technique is burning which can cause severe air pollution if smoke generated during burning is not well processed prior to discharge.

Thus, it is important to appropriately dispose garbage containing plastic bags and food containers made of plastic foam in order to recycle and reuse materials therein. Garbage classification is encouraged by many governments. But its effect is not satisfactory at least right now. In another aspect, resources on earth begin to deplete in recent years. Hence, more and more people are aware of the importance of resource recycling by actively cooperating with the resource recycling policy. It is desired that amount of garbage can be reduced significantly in a near future by successfully recycling resources in order to prolong a useful time of land for burying garbage and preserve limited resources on earth.

However, the predominant resource recycling (i.e., garbage recycling) techniques are not satisfactory now. It is often that materials capable of recycling are mixed with rubbish in a garbage bag. Hence, a cleaning employee has to open the garbage bag for picking materials capable of recycling therefrom. Unfortunately, materials capable of recycling in the garbage bag are often dirty, oily, or polluted by contaminants or toxic materials. Hence, this is a tedious and dangerous job since the cleaning employees are susceptible of contracting diseases or being poisoned.

Thus, it is desirable to provide a novel apparatus capable of automatically, safely disposing garbage. Further, the apparatus is able to open garbage bags and wash garbage as an initial cleaning step. Furthermore, the apparatus is able to classify garbage.

SUMMARY OF THE INVENTION

It is an object of the present invention to provide a garbage disposal apparatus comprising a cylindrical rotary piercing and screen assembly including a plurality of rows of blades and first needles for piercing garbage bags and classifying garbage. By utilizing this apparatus, garbage can be effectively recycled for future use, resulting in a significant reduction of garbage and an improvement of environment.

It is another object of the present invention to provide a garbage disposal apparatus capable of piercing and opening garbage bags in order to wash and disperse garbage thereafter.

It is still another object of the present invention to provide a garbage disposal apparatus in which a garbage washing as an initial cleaning step and a garbage dispersion are performed after garbage bags have been pierced and opened.

It is a further object of the present invention to provide an apparatus of piercing garbage bags and classifying garbage. The apparatus has the advantages of simple construction, inexpensiveness, and easy maintenance.

To attain the above objects and functions, the apparatus of piercing garbage bags and classifying garbage of the present invention comprising:

a frame;

drive means disposed on the frame;

a cylindrical rotary piercing and screen assembly driven by the drive means, the piercing and screen assembly comprising a first rotary piercing and screen chamber including a plurality of circumferentially disposed first openings and a second rotary piercing and screen chamber including at least one large meshed section, at least one intermediate meshed section, at least one small meshed section, each meshed section having a plurality of second openings larger than the first openings, a plurality of rows of first needles, and a plurality of rows of blades.

Preferably, the apparatus further comprising a washing and dispersion mechanism disposed beneath the second rotary piercing and screen chamber, the washing and dispersion mechanism comprising an elongate, channel-shaped, and slanted flushing container including an inlet opening proximate a discharge opening of the second rotary piercing and screen chamber, an outlet opening at a position lower than the inlet opening, a plurality of transverse rows of a plurality of second needles between the inlet and outlet openings and on an inner surface of a roof thereof, a plurality of first injection nozzles at a wall of the inlet opening, and a row of a plurality of second injection nozzles at either side thereof;

Preferably, the apparatus further comprising a plurality of garbage bags pierced by the first needles and the blades as the rotary piercing and screen assembly driven to rotate, and the pierced garbage bags discharged from the rotary piercing and screen assembly to the washing and dispersion mechanism pushed forward by water sprayed from the first injection nozzles, scattered by water sprayed from the second injection nozzles, and further pierced by the second needles so as to facilitate a subsequent garbage classification.

Preferably, the apparatus further comprising:

a first conveyor beneath the first rotary piercing and screen chamber, the first conveyor being operative to convey fine sand or particles sieved by the first openings of the first rotary piercing and screen chamber;

a second conveyor beneath the second rotary piercing and screen chamber, the second conveyor being operative to convey medium garbage sieved by the second openings of the meshed sections; and a third conveyor flush with a lowest point of the discharge opening of the second rotary piercing and screen chamber, the third conveyor being operative to convey large garbage sieved by the first and the second rotary piercing and screen chambers and discharged from the discharge opening of the second rotary piercing and screen chamber to the washing and dispersion mechanism.

The above and other objects, features and advantages of the present invention will become apparent from the following detailed description taken with the accompanying drawings.

BRIEF DESCRIPTION OF THE DRAWINGS

FIGS. 10A, 10B, 10C and 10D are cross-sectional views showing the process of washing, dispersing garbage respectively in response to the process of FIGS. 9A to 9E.

DETAILED DESCRIPTION OF THE PREFERRED EMBODIMENTS

Figure 1:
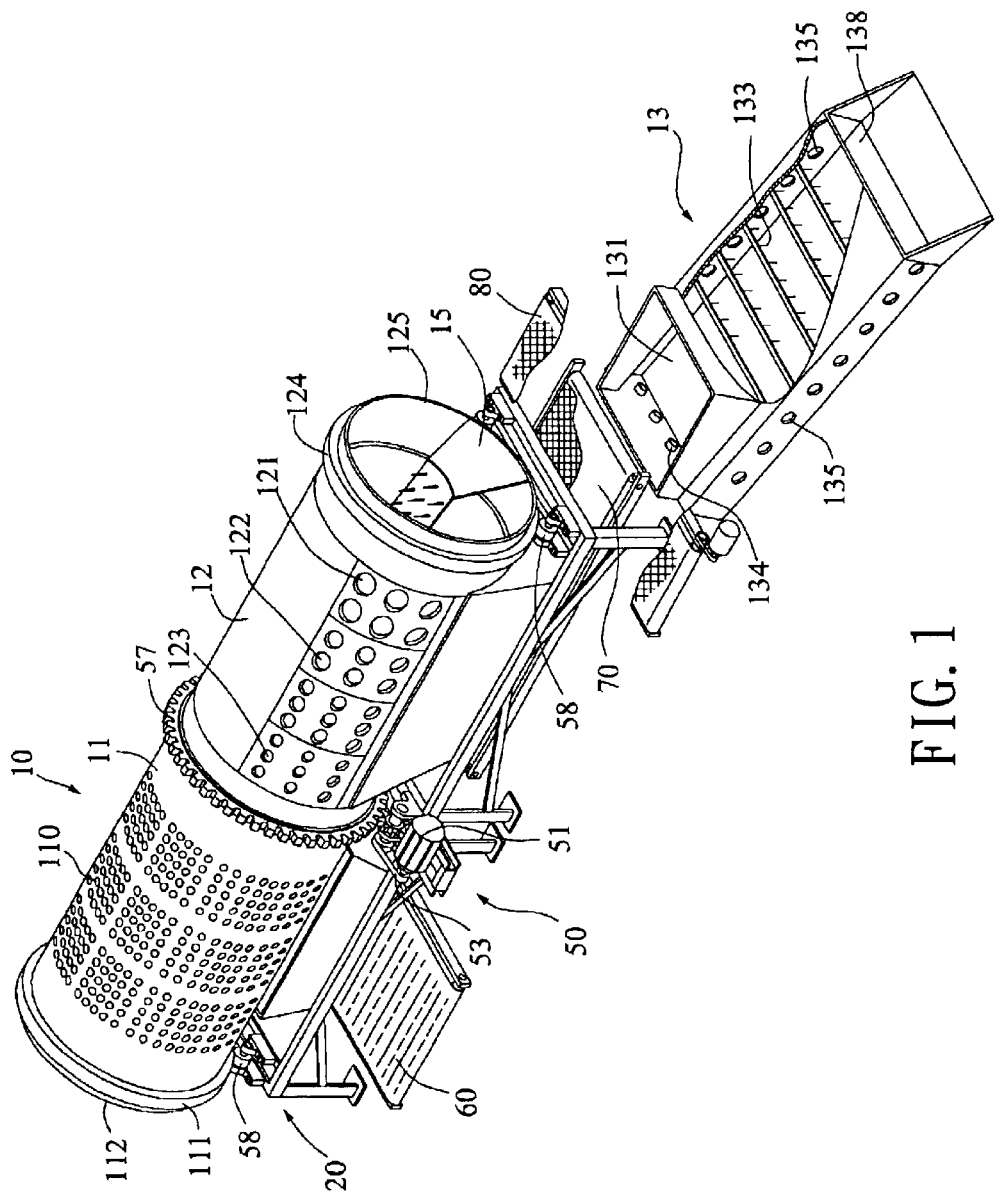
FIG. 1 is a perspective view in part section of a preferred embodiment of a garbage disposal apparatus according to the invention.
Figure 2:
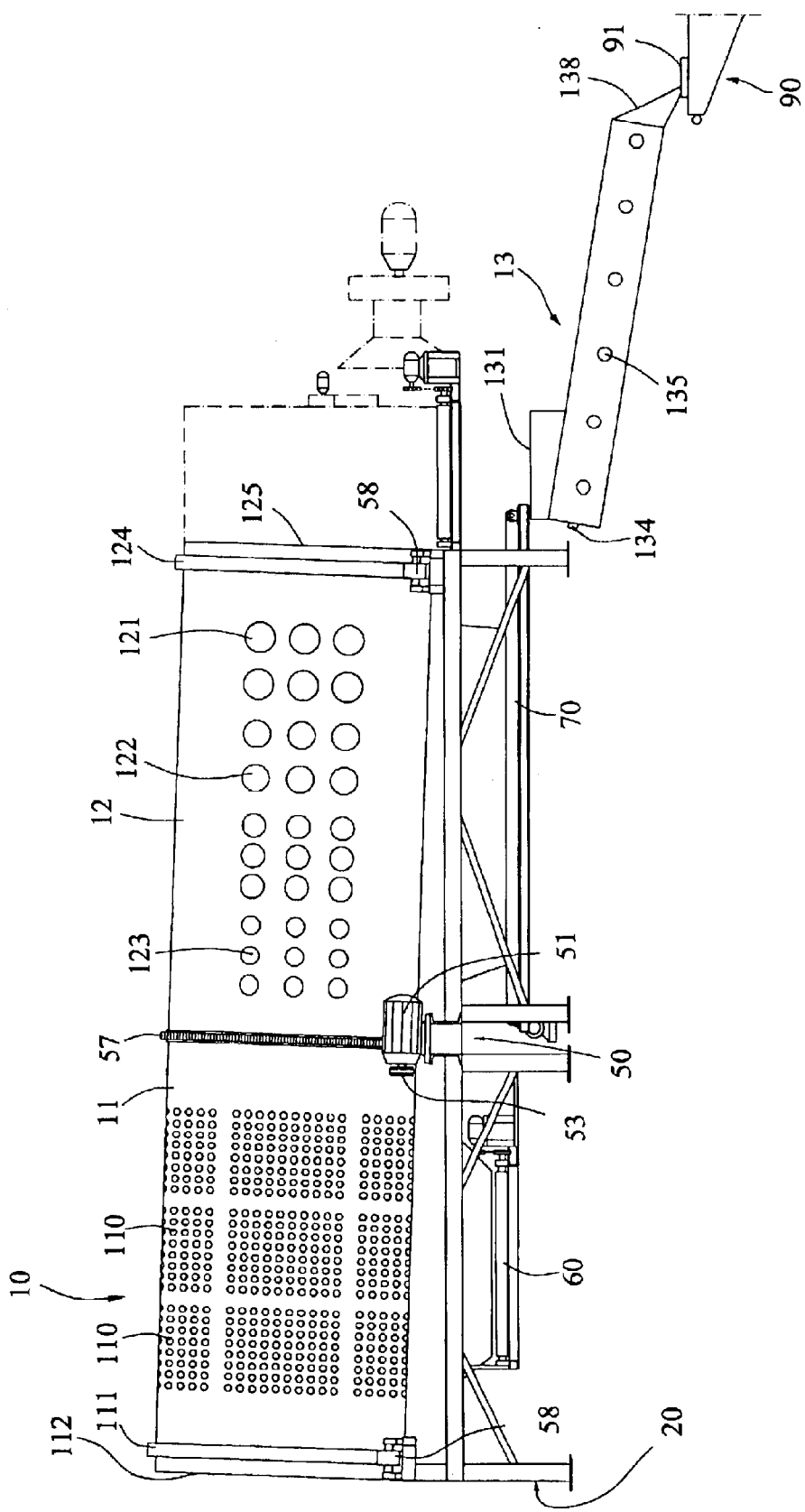
FIG. 2 is a side view of the apparatus.
Figure 3:
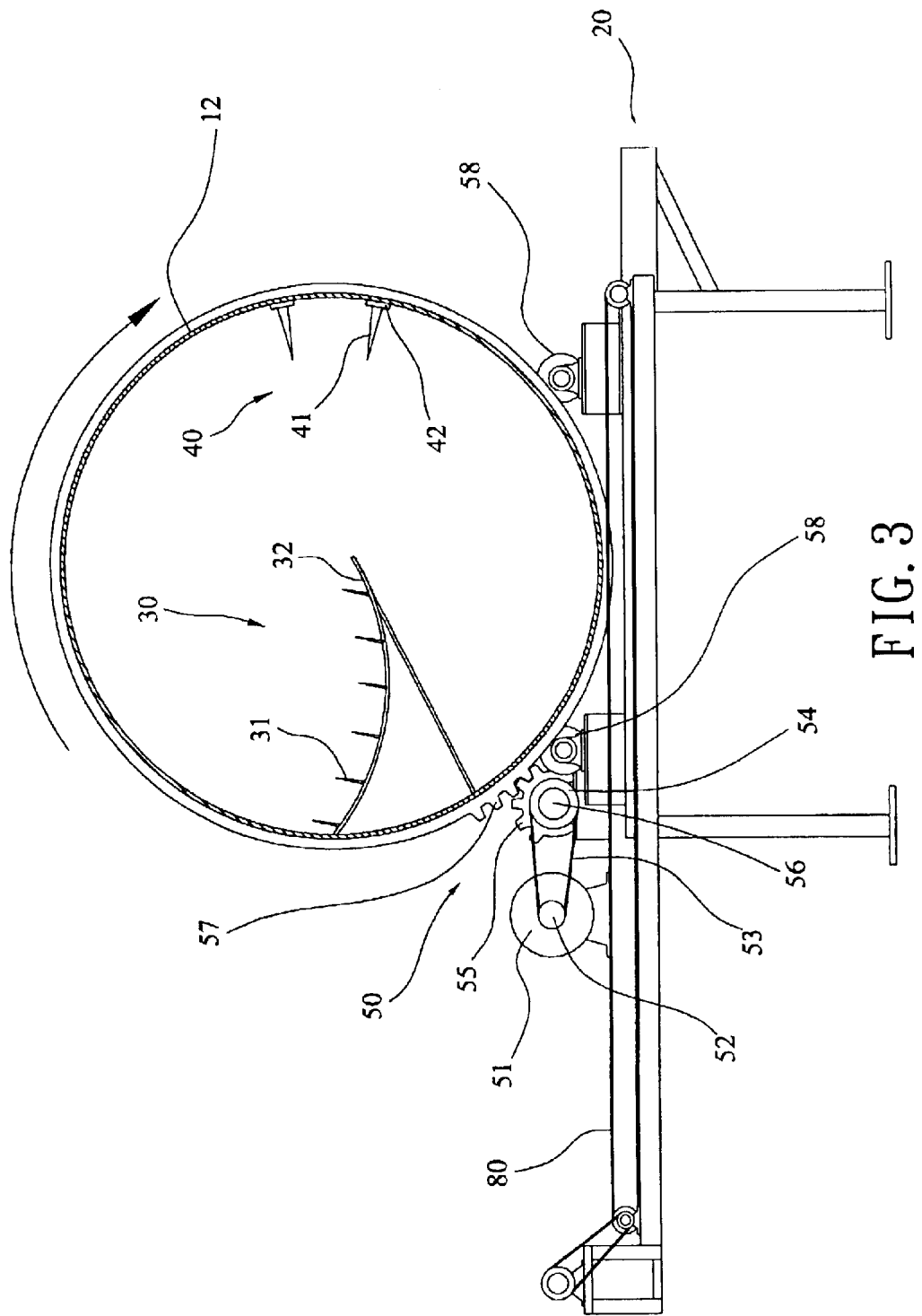
FIG. 3 is a front view of the apparatus.
Figure 4:
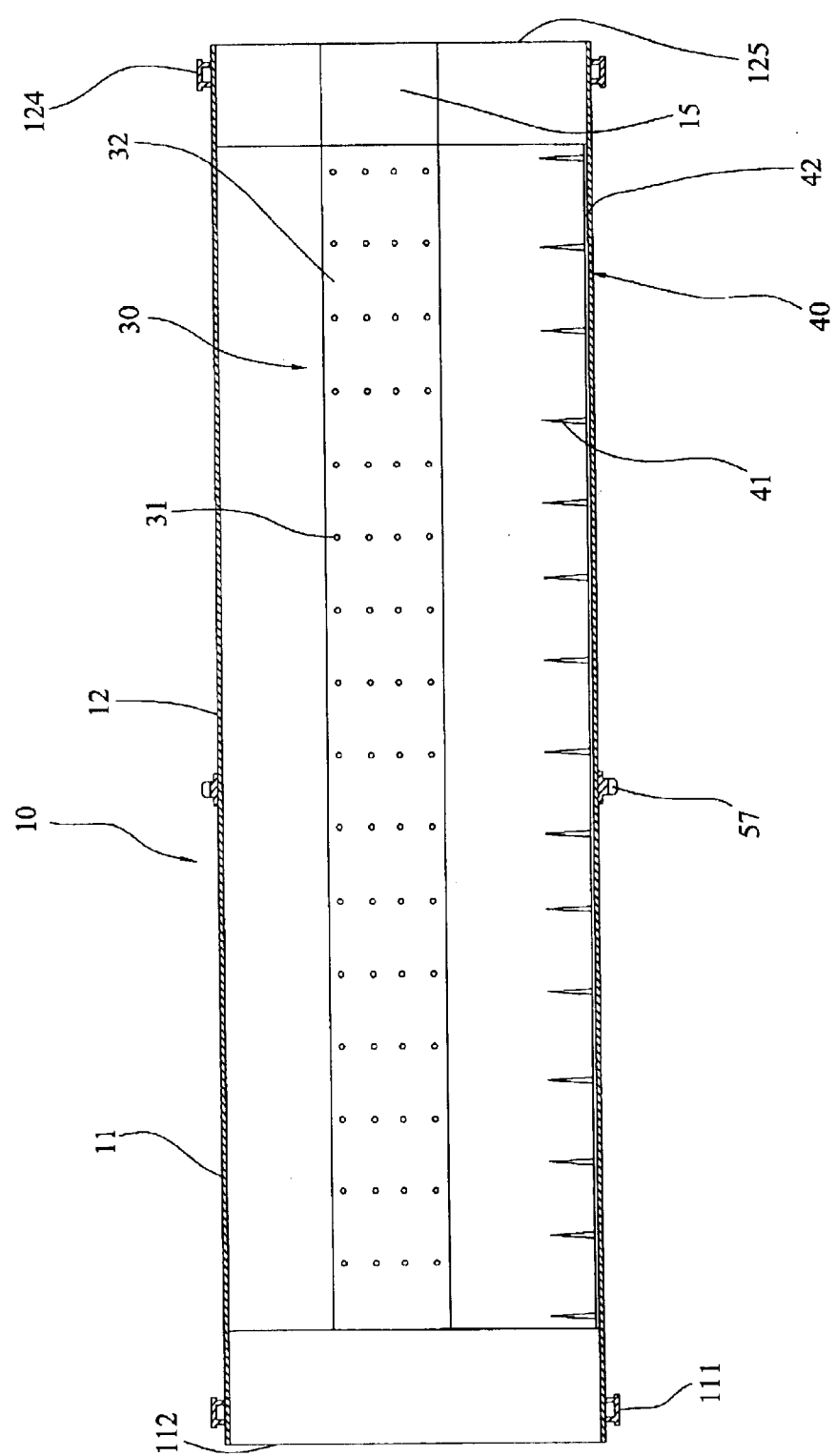
FIG. 4 is a cross-sectional view of rotary piercing and screen assembly showing an arrangement of piercing mechanism and first needles.
Figure 5:
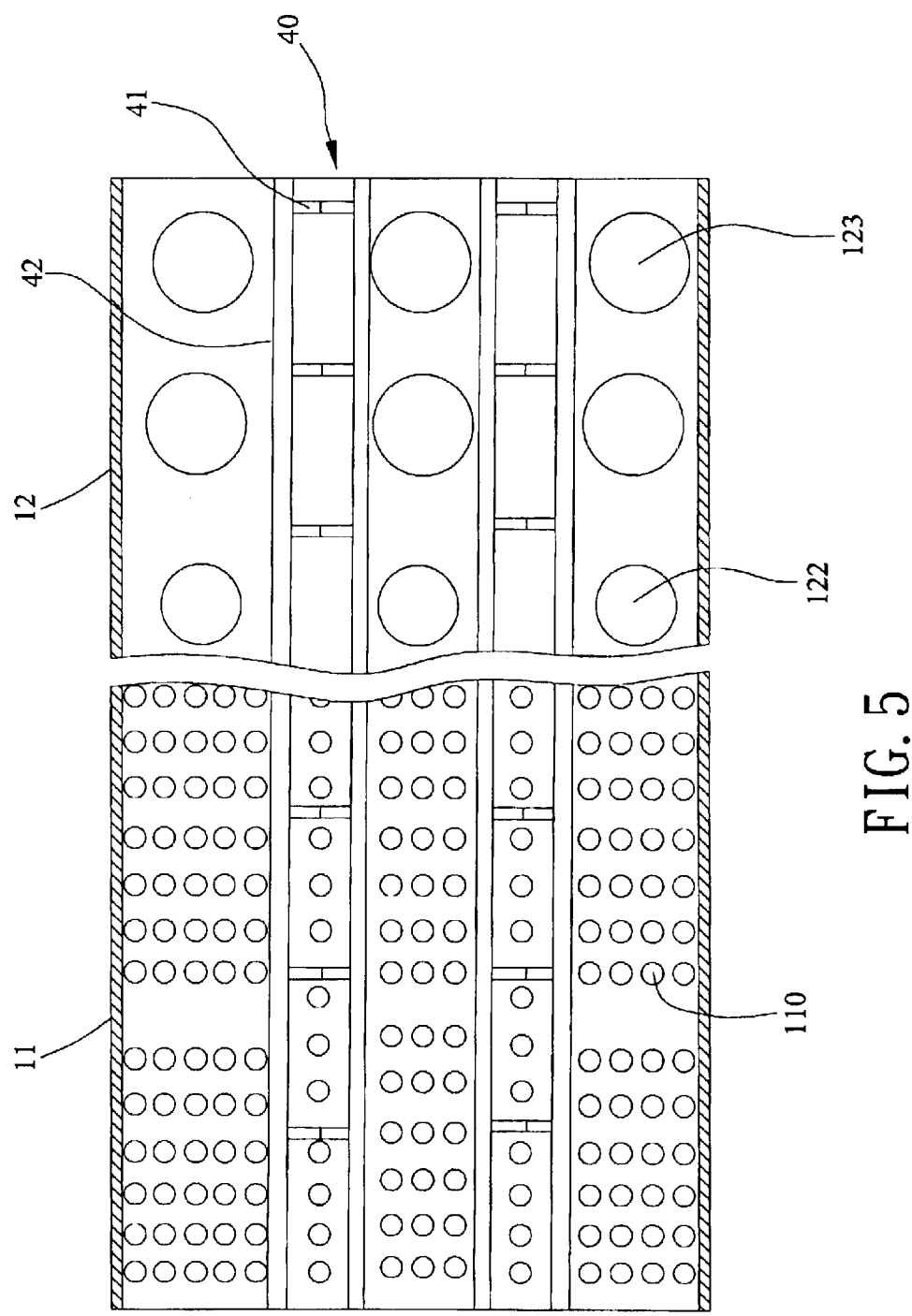
FIG. 5 is another cross-sectional view of the rotary piercing and screen assembly showing an arrangement of blades and blade supports.
Figure 6:
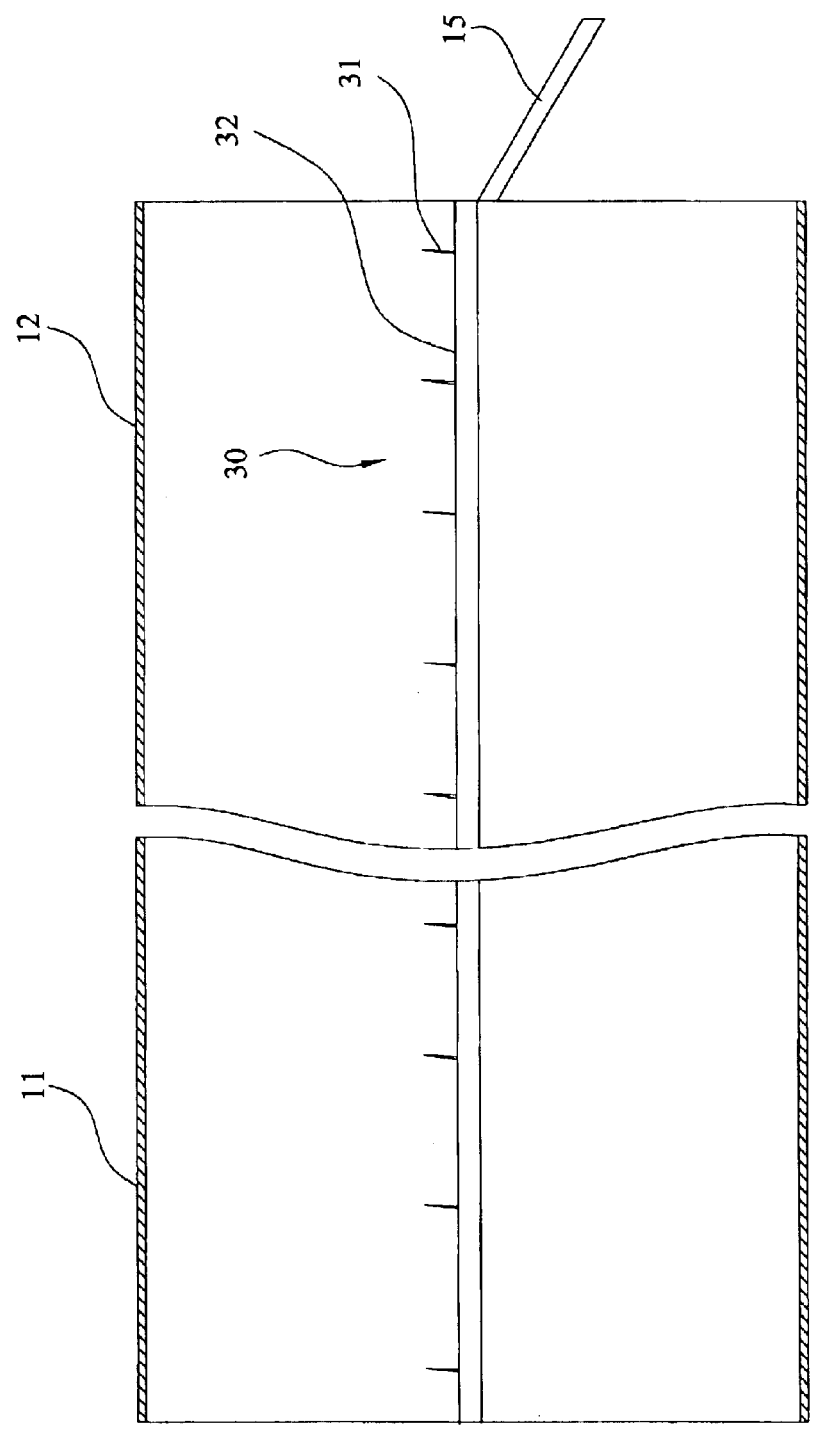
FIG. 6 is a further cross-sectional view of the rotary piercing and screen assembly showing an arrangement of first needles on the piercing mechanism.

The invention is directed to a garbage disposal apparatus. The apparatus is essential in the process of classifying or recycling garbage. The piercing of garbage bags and an initial garbage classification play a critical role in the success of a subsequent garbage disposal process because a wide variety of different materials are contained in garbage. Moreover, the apparatus of the invention is closely related to the number of classes of the garbage classification and an increase of garbage disposal speed.

As to garbage disposal implemented throughout the world, in addition to the above landfill and burning techniques many advanced garbage disposal techniques have been developed or are being developed. Such many garbage disposal techniques basically involving an initial step of piercing garbage bags prior to performing any of other subsequent steps. The apparatus of the invention is novel in classifying garbage in addition to the garbage bag piercing capability. Thus, the apparatus can satisfy future garbage disposal requirements.

The apparatus of the invention capable of piercing garbage bags, washing garbage, and classifying garbage is particularly applicable in garbage disposal. The apparatus has advantages of, for example, (1) precisely piercing garbage bags, (2) collecting sand and dust prior to piercing garbage bags, (3) separating fine particles of garbage having a size less than 5 mm from coarse ones for collection, (4) classifying large materials in garbage into two categories in which one category contains heavy materials such as articles of luggage, clothes, detachable articles, large containers, boards, etc. and the other category contains light materials such as large plastic bags, papers, containers made of plastic foam, etc., (5) separating fine particles of garbage having a size less than 220 mm and larger than 5 mm from coarse ones for collection such as organic matters, plastic bottles, etc., and (6) activating a washing and dispersion mechanism to spray strong water to wash and disperse garbage and further piercing garbage by means of a plurality of rows of second needles in order to successful classify garbage.

Referring to FIGS. 1 to 8, there is shown a garbage disposal apparatus constructed in accordance with the invention. The apparatus comprises a cylindrical rotary piercing and screen assembly 10 including a first rotary piercing and screen chamber 11 having a plurality of circumferentially disposed openings 110 having a diameter about 8 mm to about 10 mm and a second rotary piercing and screen chamber 12 having a large meshed section 121, an intermediate meshed section 122, and two small meshed section 123 (see FIG. 1). Note that the number of each meshed section 121, 122, or 123 may be varied in any of other embodiments. The apparatus further comprises a frame 20 for supporting the rotary piercing and screen assembly 10; an elongate piercing mechanism 30 mounted on an inner surface of the rotary piercing and screen assembly 10 and including a bracket 32 and a plurality of first needles 31 threadedly secured to the bracket 32; a blade unit 40 mounted on the inner surface of the rotary piercing and screen assembly 10 opposite to the piercing mechanism 30 and including a plurality of blade supports 42 and two rows of blades 41 threadedly secured to the blade supports 42; a drive unit 50 for rotating the rotary piercing and screen assembly 10 and including an annular toothed section 57 at the junction of the first and the second rotary piercing and screen chambers 11 and 12 and a drive source consisting of a motor 51, a pulley 52 rotatably attached to the shaft of the motor 51, a pinion 55 rotatably attached to a shaft 56, a pulley 54 also rotatably attached to the shaft 56, and a belt 53 attached to both pulleys 52 and 54; a first conveyor 60 beneath the first rotary piercing and screen chamber 11 and perpendicular to a lengthwise direction of the first rotary piercing and screen chamber 11, the first conveyor 60 being adapted to convey fine sand or particles sieved by the openings 110 of the first rotary piercing and screen chamber 11; a second conveyor 70 beneath the second rotary piercing and screen chamber 12 and parallel to a lengthwise direction of the second rotary piercing and screen chamber 12, the second conveyor 70 being adapted to convey medium garbage sieved by the openings of the meshed sections 121, 122, and 123 of the second rotary piercing and screen chamber 12 and a number of not pierced small garbage bags to a next stage; a washing and dispersion mechanism 13 as the next stage of the second conveyor 70 disposed beneath a discharge opening 125 of the second rotary piercing and screen chamber 12, the washing and dispersion mechanism 13 being implemented as an elongate channel-shaped flushing container and including an inlet opening 131, an outlet opening 138 at a position lower than the inlet opening 131 (i.e., the washing and dispersion mechanism 13 being slanted), a plurality of transverse rows of a plurality of second needles 133 between the inlet and outlet openings 131 and 138 and on the inner surface of the roof, a plurality of first injection nozzles 134 at the wall of the inlet opening 131, and two rows of a plurality of second injection nozzles 135 at both sides; a third conveyor 80 flush with a lowest point of the discharge opening 125 of the second rotary piercing and screen chamber 12 and perpendicular to the lengthwise direction of the second rotary piercing and screen chamber 12, the third conveyor 80 being adapted to convey large garbage sieved by the first and the second rotary piercing and screen chambers 11 and 12 to a next stage for further disposal; a first annular flange 111 at the feed opening 112 of the first rotary piercing and screen chamber 11; a second annular flange 124 at the discharge opening 125 of the second rotary piercing and screen chamber 12; and two pairs of rollers 58, each pair being adapted to rotatably support the first annular flange 111 or the second annular flange 124.

The apparatus is adapted to pierce garbage bags by means of the blades 41 and the first needles 31 mounted on the inner surface of the rotary piercing and screen assembly 10 as garbage is revolving in the rotary piercing and screen assembly 10 being rotated. Further, the pierced garbage is sieved by the openings 110 and the openings of the meshed sections 121, 122, and 123 of the second rotary piercing and screen chamber 12 prior to an initial classification.

Figure 7:
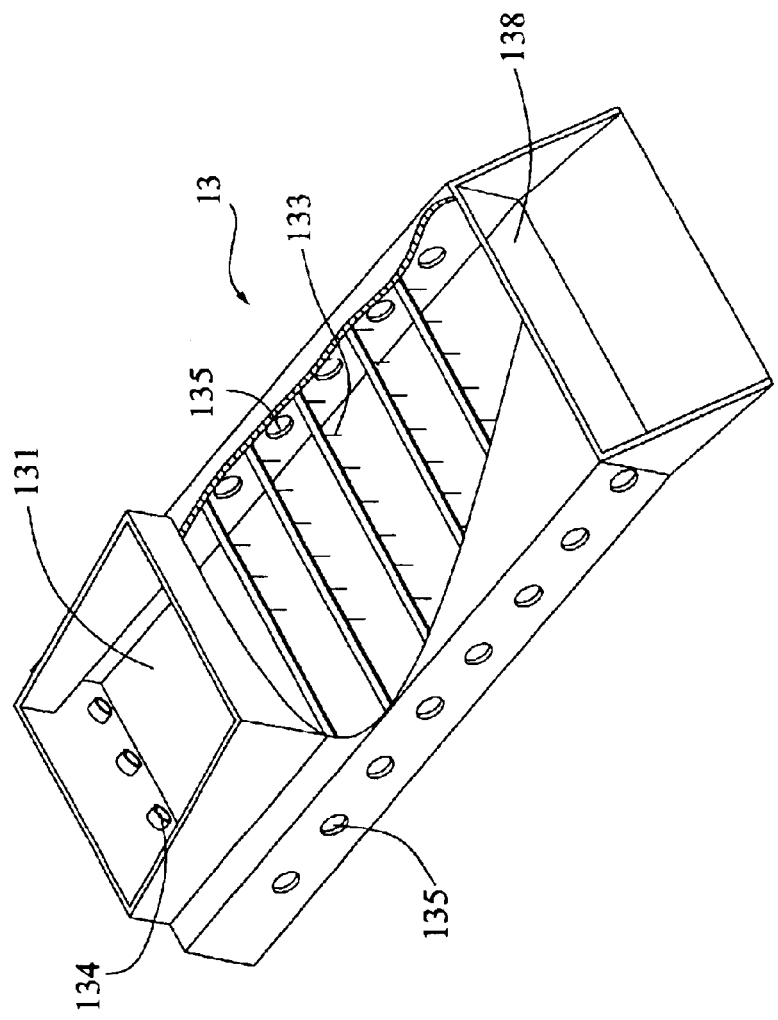
FIG. 7 is a perspective view in part section of washing and dispersion mechanism.
Figure 8:
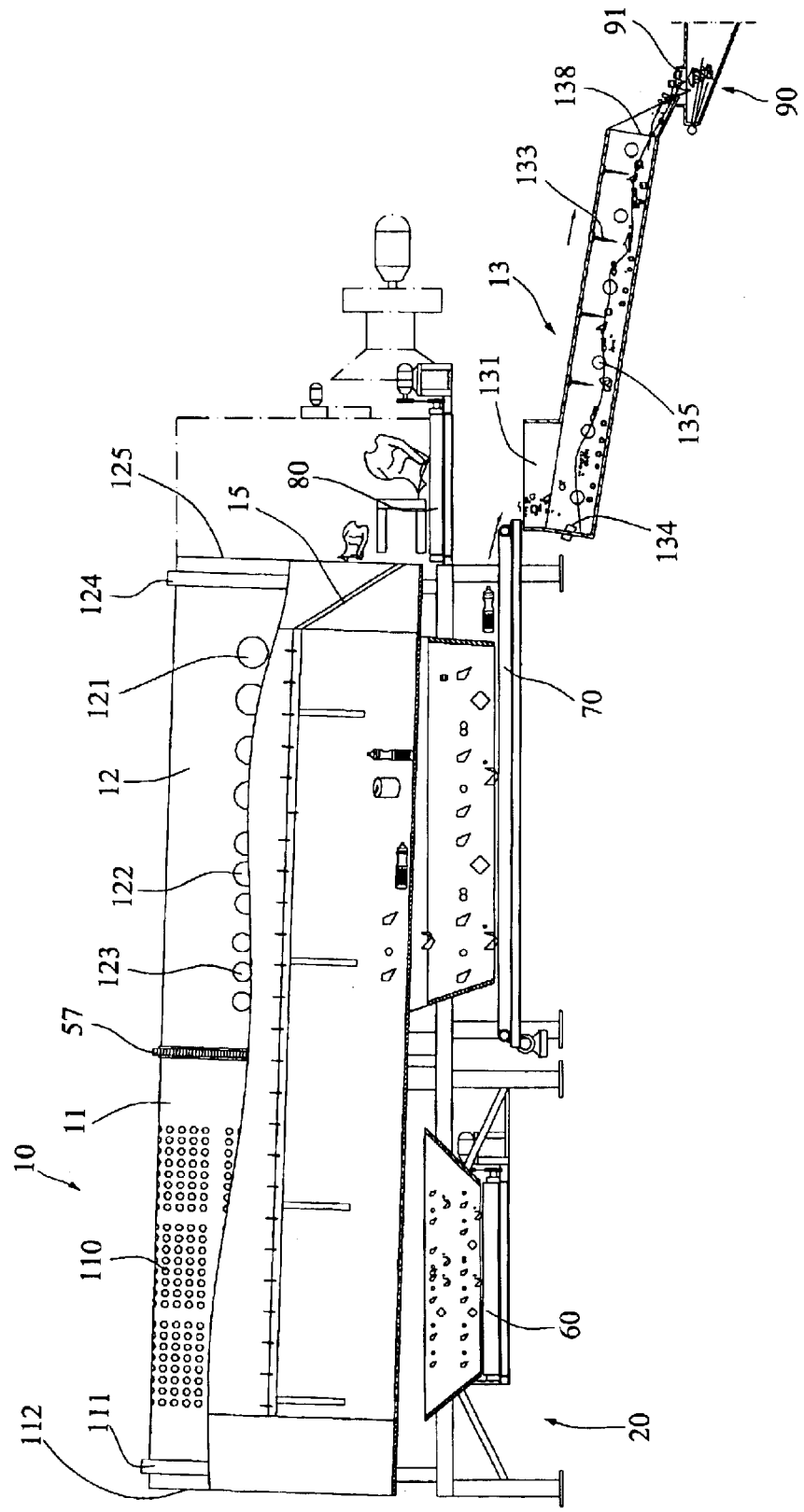
FIG. 8 is a cross-sectional view of FIG. 2 showing the apparatus in the process of piercing and opening garbage bags and conveying, washing, and dispersing garbage.

Referring to FIG. 10 in conjunction with FIGS. 1, 7 and 8, the washing and dispersion mechanism 13 as stated above is implemented as an elongate, channel-shaped, and slanted flushing container 13 and including a topmost inlet opening 131 and a plurality of transverse rows of a plurality of second needles 133 between the inlet and outlet openings 131 and 138 and on the inner surface of the roof, the length of each second needle 133 is about half the height of the flushing container 13 (see FIGS. 7 and 10). Further, the second needles 133 are alternate in two adjacent rows (see FIGS. 1 and 7). As such, a number of small garbage bags not pierced by the second rotary piercing and screen chamber 12 will be completely pierced as they pass through the washing and dispersion mechanism 13.

In detail, the first injection nozzles 134 are adapted to spray water toward the second needles 133 in the flushing container 13 (see FIGS. 1, 7 and 10). An angle of each first injection nozzle 134 with respect to a horizontal line is slightly toward the inclined bottom of the flushing container 13 so that water sprayed from the first injection nozzles 134 first washes the bottom of the flushing container 13 to form a wavy flow for flushing garbage. Each row of the second needles 133 is between two adjacent second injection nozzles 135 in either side. An angle of each second injection nozzle 135 with respect to a horizontal line is about 2 to 3 degrees toward the outlet opening 138. A center of the second injection nozzle 135 is about flush with the end of the second needle 133. Water flow of the injection nozzles 134 and 135 is well controlled to cause a surface of water in the flushing container 13 at about half the height of the flushing container 13, i.e., at about the center of the second injection nozzle 135. Hence, about one half water sprayed from the second injection nozzle 135 is above the surface of water in the flushing container 13 for pushing garbage and about the other half water is sprayed below the surface of water in the flushing container 13 for dispersing garbage respectively.

Figure 9A:
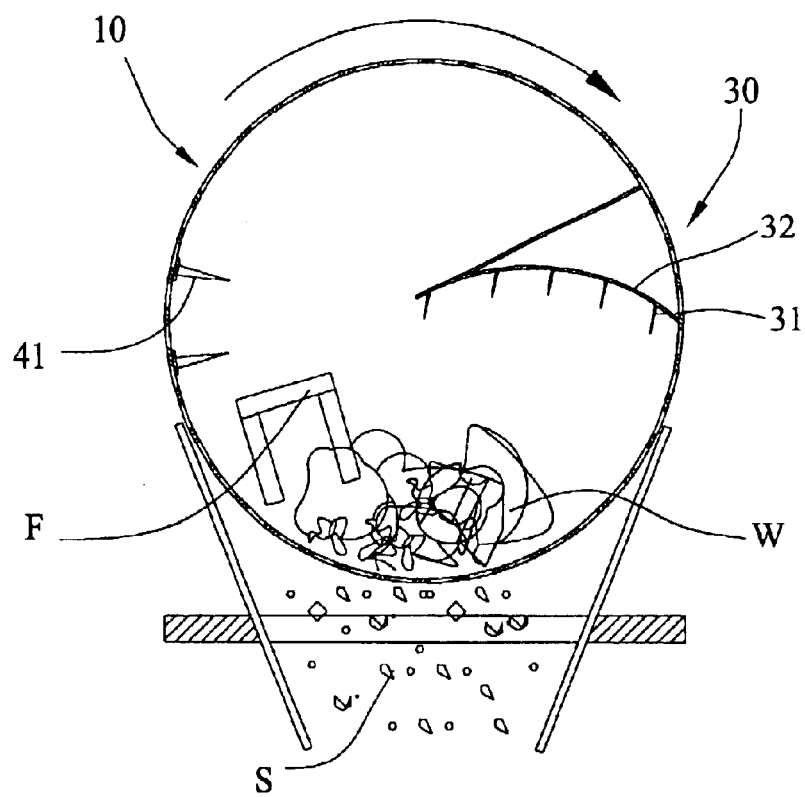
FIGS. 9A, 9B, 9C, 9D and 9E are plan views showing the process of piercing garbage bags and classifying garbage respectively.
Figure 9C:
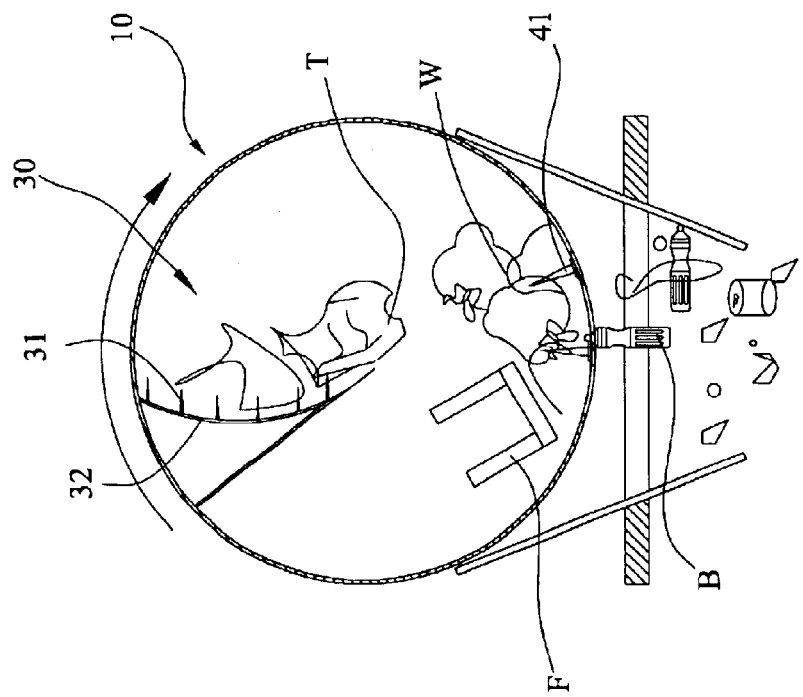
Figure 9B:
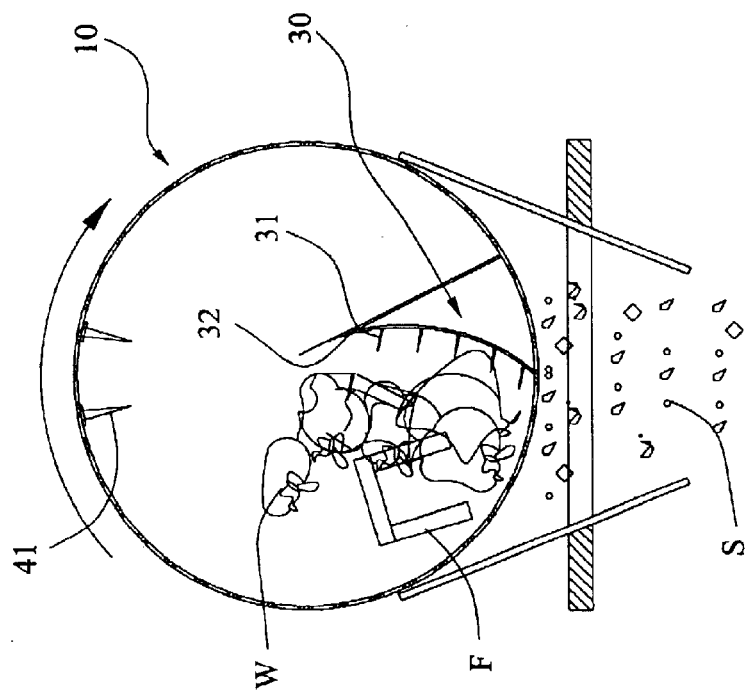
Figure 9E:
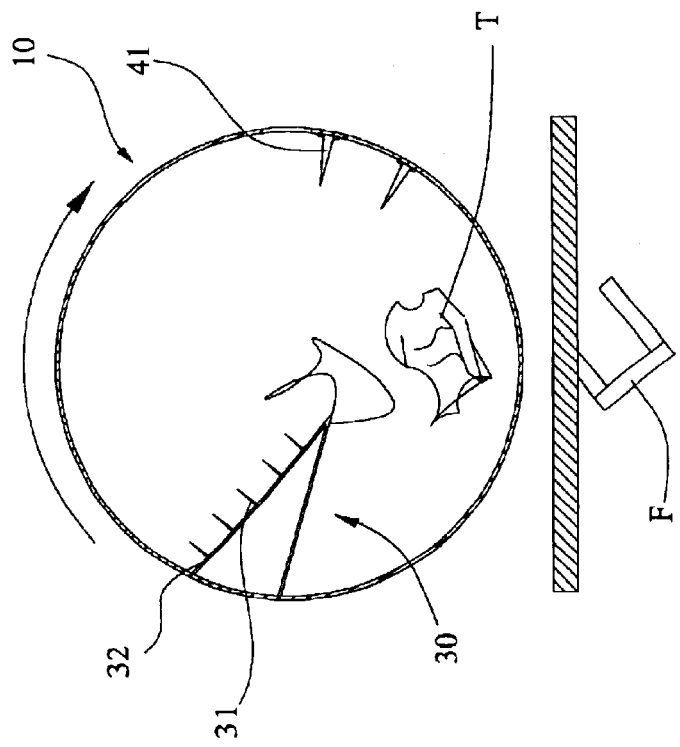
Figure 9D:
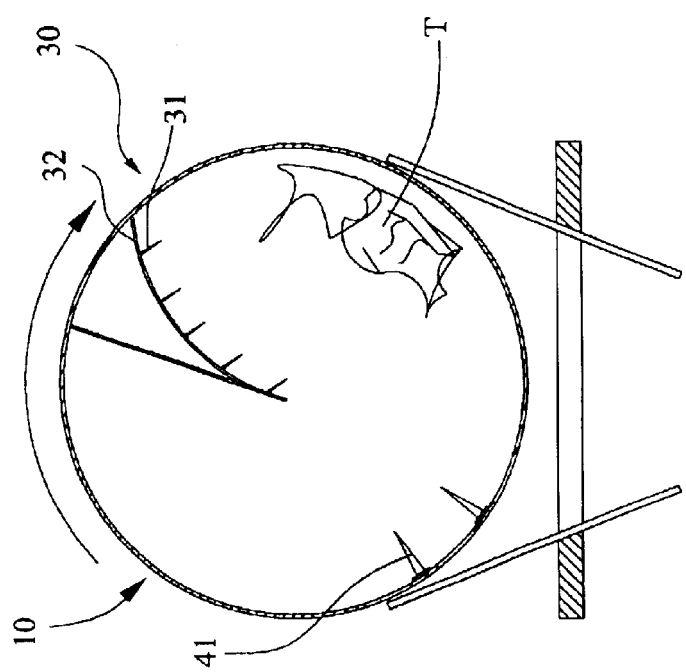

Referring to FIGS. 9A to 9E in conjunction with FIG. 8, the piercing process and classifying process of the invention will now be described below. First activate (i.e., clockwise rotate) the rotary piercing and screen assembly 10. Next, feed garbage bags into the first rotary piercing and screen chamber 11 of the rotary piercing and screen assembly 10 from the feed opening 112. Sand and dust S are continuously falling from the openings 110 while the rotary piercing and screen assembly 10 is rotating (FIG. 9A). Garbage bags W, clothes T, and other large articles having a diameter larger than 8 mm will be pushed up by the piercing mechanism 30 (FIG. 9B). Next, the garbage bags W and dispersed materials will drop from the piercing mechanism 30 and the clothes T and similar nonrigid articles are still hooked by the first needles 31 when the piercing mechanism 30 is rotated to an upper portion of the rotary piercing and screen assembly 10 (FIG. 9C). The garbage bags W will be scraped by the first needles 31 on the piercing mechanism 30 during dropping. And in turn the garbage bags W are pierced by the blades 41 on the blade supports 42 while dropping. The garbage bags W will be completely pierced to disperse garbage therein by the continuing rotation of the rotary piercing and screen assembly 10. There are many different sized openings having a diameter from 135 mm to 220 mm arranged at sides of the blade supports 42 in addition to the openings of the meshed sections 121, 122, and 123 of the second rotary piercing and screen chamber 12 (see FIGS. 1 and 5). The area of the meshed sections 121, 122, and 123 is about one fifth that of the outer surface of the second rotary piercing and screen chamber 12. In other words, there is no provision of opening in other portions of the outer surface of the second rotary piercing and screen chamber 12. The clothes T will drop from the piercing mechanism 30 and the dispersed materials continue to fall through the openings of the meshed sections 121, 122, and 123 when the piercing mechanism 30 is rotated to a lower portion of the rotary piercing and screen assembly 10 (FIG. 9D). The clothes T are dropped at the portions of the outer surface of the second rotary piercing and screen chamber 12 with no opening. Finally, large articles F having a diameter larger than 220 mm and the clothes T are transported to the discharge opening 125 of the rotary piercing and screen assembly 10 via a guide 15 (FIG. 1) prior to conveying to the third conveyor 80 for a further disposal (FIG. 9E).

Note that the rotary piercing and screen assembly 10 is slightly inclined for facilitating a forward conveying of garbage from the feed opening 112 to the discharge opening 125 while the rotary piercing and screen assembly 10 is rotating.

Referring to FIGS. 10A to 10D in conjunction with FIGS. 7 and 8, the operation of the washing and dispersion mechanism 13 will now be described below. Water sprayed from the injection nozzles 134 and 135 forms a wavy flow and is controlled to cause a surface of water in the flushing container 13 at about the center of the second injection nozzle 135. Further, garbage bags A dropped at the inlet opening 131 will be pushed forward by the flushing water in the flushing container 13 (FIG. 10A). The garbage bags A will be caught by the pointed ends of the second needles 133 (FIG. 10B). Water sprayed from the second injection nozzles 135 will form a whirl under the second needles 133 to rotate the garbage bags A fast. Hence, the garbage bags A are pierced by the second needles 133 so that garbage can be rapidly dispersed in the flow. Note that the above garbage dispersion is done in a very short time after piercing the garbage bags A. The dispersed garbage is floated on water while flowing toward the outlet opening 138. The dispersed garbage is further scattered by continuously sprayed water from the second injection nozzles 135 (FIGS. 10C and 10D). Also, the dispersed garbage is washed as an initial cleaning step. Finally, the garbage is flowed to an inlet opening 91 of a next stage 90 through the outlet opening 138. A manual or automatic garbage recycling is performed at the stage 90.

It is noted that the invention aims at providing a rotary piercing and screen assembly. Within the rotary piercing and screen assembly there are provided a plurality of first needles on an elongate piercing mechanism and a plurality of blades on a plurality of rows of a blade unit. Garbage bags are pierced by the first needles and the blades as the rotary piercing and screen assembly continues to rotate. Also, in a flushing container there are provided a plurality of transverse rows of a plurality of second needles between the inlet and outlet openings and on the inner surface of the roof, a plurality of first injection nozzles at the wall of the inlet opening, and two rows of a plurality of second injection nozzles at both sides both injection nozzles being adapted to spray strong water. Garbage bags are then floated on water in the flushing container and rotated by strong sprayed water from the injection nozzles. Hence, garbage bags will be pierced as they pass the second needles. Further, the pierced garbage bags are dispersed and washed by strong sprayed water for facilitating a subsequent garbage classification step. The above characteristics and construction are unique as contemplated by the invention.

Further notes that the first rotary piercing and screen chamber having a plurality of openings and the second rotary piercing and screen chamber having a plurality of openings on its large, intermediate, and small meshed sections of the rotary piercing and screen assembly of the invention may be separately formed prior to connecting together depending on applications. Also, the plurality of first needles of the elongate piercing mechanism and the plurality of blades of the plurality of rows of the blade unit may be separately formed prior to mounting in the rotary piercing and screen assembly depending on applications. Thus, not all of the openings, the first needles, and the blades of the rotary piercing and screen assembly are required to form by the invention. That is, one (or two) of the openings, the first needles, and the blades are sufficient.

It is also noted that not both the rotary piercing and screen assembly and the washing and dispersion mechanism are required to form by the invention if garbage classification has been followed by people. That is, one of the rotary piercing and screen assembly and the washing and dispersion mechanism is sufficient.

While the invention herein disclosed has been described by means of specific embodiments, numerous modifications and variations could be made thereto by those skilled in the art without departing from the scope and spirit of the invention set forth in the claims.

What is claimed is:

1. An apparatus of piercing garbage bags and classifying garbage comprising:
   a frame;
   drive means disposed on the frame;
   a cylindrical rotary piercing and screen assembly driven by the drive means, the piercing and screen assembly comprising a first rotary piercing and screen chamber including a plurality of circumferentially disposed first openings and a second rotary piercing and screen chamber including at least one large meshed section, at least one intermediate meshed section, at least one small meshed section, a plurality of rows of first needles, and a plurality of rows of blades; and
   a washing and dispersion mechanism disposed beneath the second rotary piercing and screen chamber, the washing and dispersion mechanism comprising a plurality of second needles on an inner surface of a roof thereof, a plurality of first injection nozzles at a wall of the inlet opening, and a plurality of second injection nozzles at either side thereof.

2. The apparatus of claim 1, further comprising an elongate piercing mechanism mounted on an inner surface of the rotary piercing and screen assembly and including an elongate bracket with the first needles threadedly secured thereto.

3. The apparatus of claim 1, further comprising blade means mounted on the inner surface of the rotary piercing and screen assembly and including a plurality of blade supports and a plurality of rows of blades threadedly secured to the blade supports.

4. The apparatus of claim 1, further comprising:
   a first conveyor beneath the first rotary piercing and screen chamber, the first conveyor being operative to convey fine sand or particles sieved by the first openings of the first rotary piercing and screen chamber;
   a second conveyor beneath the second rotary piercing and screen chamber, the second conveyor being operative to convey medium garbage sieved by the second openings of the meshed sections; and
   a third conveyor flush with a lowest point of the discharge opening of the second rotary piercing and screen chamber, the third conveyor being operative to convey large garbage not sieved by the first and the second rotary piercing and screen chambers and discharged from the discharge opening of the second rotary piercing and screen chamber to a next further garbage classification.

5. The apparatus of claim 4, wherein in response to a rotation of the rotary piercing and screen assembly, feed the garbage bags into a feed opening of the first rotary piercing and screen chamber so as to cause sand and dust to fall from the first openings on the first conveyor, while piercing the garbage bags, large materials dispersed from the garbage bags will be pushed up by the piercing mechanism when they enter into the second rotary piercing and screen chamber, all materials dispersed from the garbage bags will drop from the piercing mechanism except non-rigid articles hooked by the first needles when the piercing mechanism is rotated to an upper portion of the rotary piercing and screen assembly, the garbage bags are scraped by the first needles during dropping, the scraped garbage bags are pierced by the blades so as to completely pierce the garbage bags for dispersing garbage therein by the continuing rotation of the rotary piercing and screen assembly, one portion of the dispersed garbage sieved by the second openings of the meshed sections is fallen on the second conveyor, and the other portion of the dispersed garbage not sieved by the second openings of the meshed sections is discharged from the discharge opening of the second rotary piercing and screen chamber to fall on the third conveyor for completing an initial garbage classification.

6. The apparatus of claim 1, wherein the drive means comprises a motor, a pulley rotatably attached to a shaft of the motor, a pinion driven by the pulley, and an annular toothed section at a junction of the first and the second rotary piercing and screen chambers, the toothed section being driven by the pinion.

7. The apparatus of claim 1, further comprising a first annular flange at the feed opening of the first rotary piercing and screen chamber, a second annular flange at the discharge opening of the second rotary piercing and screen chamber, and two pairs of rollers, each pair being operative to rotatably support the first or the second annular flange.

8. The apparatus of claim 1, wherein the blades are disposed on an inner surface of the meshed sections.

9. The apparatus of claim 1, wherein a tip of each second needle is about flush with half a height of the flushing container.

10. The apparatus of claim 1, wherein an angle of each first injection nozzle with respect to a horizontal line is slightly toward an inclined bottom of the flushing container.

11. The apparatus of claim 1, wherein each row of the second needles is between two adjacent second injection nozzles in either side of the flushing container and an angle of each second injection nozzle with respect to a horizontal line is slightly toward the outlet opening.

12. The apparatus of claim 1, wherein the second rotary piercing and screen chamber further comprises each meshed section having a plurality of second openings larger than the plurality of first openings.

13. The apparatus of claim 1, wherein the washing and dispersion mechanism further comprises an elongate, channel-shaped, and slanted flushing container including an inlet opening proximate a discharge opening of the second rotary piercing and screen chamber, an outlet opening at a position lower than the inlet opening, a plurality of transverse rows of a plurality of second needles between the inlet and outlet openings and on an inner surface of a roof thereof, a plurality of first injection nozzles at a wall of the inlet opening, and a row of a plurality of second injection nozzles at either side thereof.

14. The apparatus of claim 1, wherein a plurality of garbage bags are pierced by the first needles and the blades as the rotary piercing and screen assembly is driven to rotate, and the pierced garbage bags discharged from the rotary piercing and screen assembly to the washing and dispersion mechanism are pushed forward by water sprayed from the first injection nozzles, scattered by water sprayed from the second injection nozzles, and further pierced by the second needles so as to facilitate a subsequent garbage classification.

15. An apparatus of piercing garbage bags and classifying garbage comprising:

a frame;

driving means disposed on the frame; and a piercing and screening assembly, the screening assembly comprising:

a cylindrical rotary body driven by the driving means along a rotation direction, the cylindrical rotary body having an inner surface;

a plurality of first piercing objects mounted on the inner surface;

a support body mounted on the inner surface, wherein part of the support body extends inward of the rotary body away from the inner surface; and a plurality of second piercing objects having piercing ends and opposing ends, wherein the opposing ends are mounted on the support body so that the piercing ends of the second piercing objects are moved along the rotation direction toward the garbage when the cylindrical are driven by the driving means, and wherein the cylindrical rotary body comprises a first screening chamber and a second screening chamber, the first screening chamber having a plurality of circumferentially disposed first openings, the second screening chamber having a plurality of circumferentially disposed second openings larger than the first openings.

* * * * *

UNITED STATES PATENT AND TRADEMARK OFFICE
CERTIFICATE OF CORRECTION

PATENT NO. : 6,955,265 B2  
DATED : October 18, 2005  
INVENTOR(S) : Steven Tse

It is certified that error appears in the above-identified patent and that said Letters Patent is hereby corrected as shown below:

Column 3,  
Line 22, after "bags" "-" should be deleted.

Signed and Sealed this

Eleventh Day of April, 2006

JON W. DUDAS  
*Director of the United States Patent and Trademark Office*